Oct. 2, 1934.   C. T. OLSON   1,975,170
OIL SEAL
Filed June 18, 1932
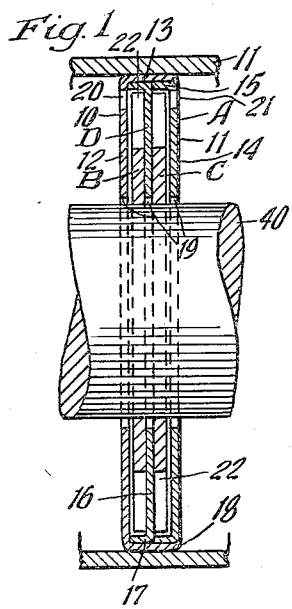
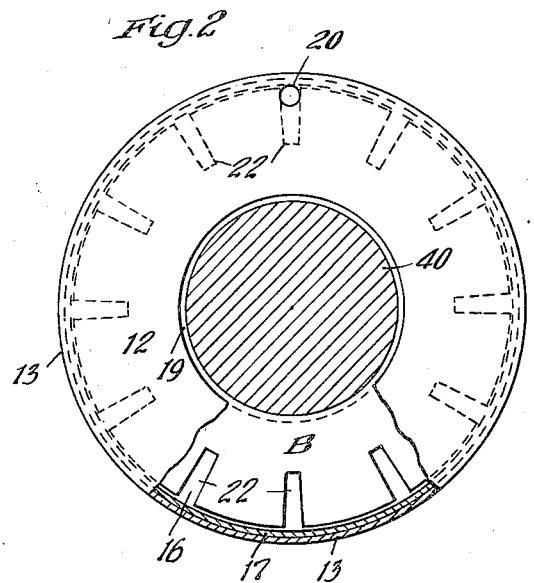
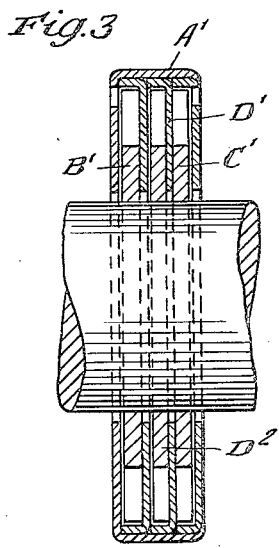
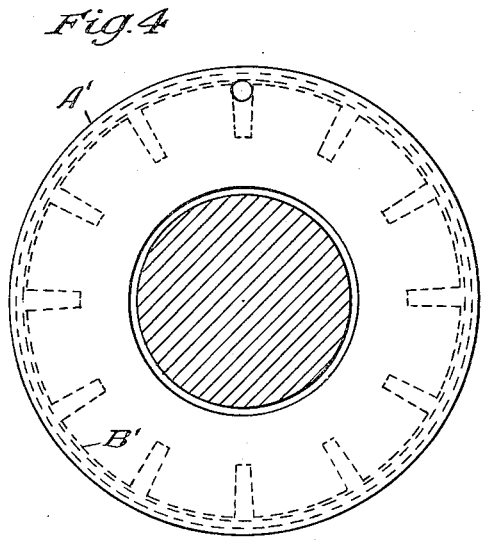
Inventor
Clarence T. Olson
By Joseph Harris
His Atty.

Patented Oct. 2, 1934

1,975,170

UNITED STATES PATENT OFFICE 1,975,170

OIL SEAL

Clarence T. Olson, Chicago, Ill., assignor to Chicago Rawhide Manufacturing Company, Chicago, Ill., a corporation of Illinois Application June 18, 1932, Serial No. 617,950

8 Claims. (Cl. 286—5)

This invention relates to improvements in oil seal.

One object of the invention is to provide a seal or retainer for oil, grease or other lubricant for shafts and which may be manufactured economically, sold and shipped completely assembled as a unitary article, and as such, readily placed in operative position.

Another object of the invention is to provide a seal of the character indicated wherein means are employed for, in effect, pumping back into the chamber of the shaft housing, any lubricant that may seep along the shaft to the seal, the pumping action being effected centrifugally.

Another object of the invention is to provide a seal of the character indicated in the preceding paragraph wherein is included a second sealing means of similar character but operating in the opposite direction to prevent the admission of any moisture or other foreign matter lengthwise of the shaft in the opposite direction.

Another object of the invention is to provide a seal of the character indicated wherein are employed a plurality of independently acting sealing means of the centrifugal type arranged in tandem formation lengthwise of the shaft and wherein the end sealing means operate in opposite manner to prevent discharge of oil or other lubricant and admission of foreign matter, respectively.

Other objects of the invention will more clearly appear from the description and claims hereinafter following.

In the drawing forming a part of this specification, Figure 1 is a diametrical, sectional view of an oil seal embodying the improvements shown in the operative position in association with a shaft and surrounding shaft housing. Figure 2 is a side elevational view of the structure shown in Figure 1, part of the seal casing being broken away in order to more clearly illustrate certain parts. Figure 3 is a view similar to Figure 1, illustrating another embodiment of the invention. And Figure 4 is a side elevational view of the arrangement shown in Figure 3.

Referring first to the construction illustrated in Figures 1 and 2, a portion of a shaft with which the seal is intended to cooperate, is indicated at 40, the same being centrally disposed within a housing, a portion of which is indicated at 11, and in the instance shown, with a cylindrical interior.

The improved seal, as shown, comprises, broadly, a casing A; two impellers B and C; and a partition D.

The casing A is preferably made of two sheet metal stampings 10 and 11, each of relatively shallow dish or cup shape. The member 10 is provided with a radially extending side wall 12 and peripheral rim 13 and similarly, the member 11 is provided with a radially extending side wall 14 and narrow peripheral rim 15, the latter being telescoped within the rim 13.

The partition D is also preferably in the form of a sheet metal stamping similar to the member 11 and faced in the same direction, the same having a partition forming wall 16 and narrow rim 17 snugly fitting within the outer casing member 10.

The parts are assembled as clearly shown in Figure 1 and with the impellers B and C in place, all the parts are held in assembled position by any suitable means such as by spinning the free edge 18 of the outer casing member over the other casing member 11. Each of the members 10 and 11 and the partition member D are provided with centrally located alined openings 19—19 to accommodate the shaft 40 therethrough, said openings being slightly larger in diameter than the diameter of the shaft 40 with which the seal is intended to be used. Each member 10 and 11 is also provided with a discharge opening 20 and 21 respectively, the same being preferably located at the top when the assembled unit is in place on the shaft.

The two impellers, rotors or slingers B and C are of like construction, each made of some suitable material, such as leather, fabric, fibre, micarta or cork composition. Each is in the form of an annular disc or ring with a central opening of initially slightly lesser diameter than the shaft to which it is intended to be applied so that, when the seal is in place, both of the impellers B and C will have a fluid tight friction driving fit with the shaft. The two impellers are located in the two chambers formed by the partition member D, as shown, and are of such thickness as to provide a running clearance with the chamber walls. Each disc impeller B and C is provided around its periphery with a series of preferably uniformly spaced and radially extending notches 22—22, which successively pass the discharge openings 20 and 21 when the shaft is rotated, the outside diameters of the impellers being slightly less than the diameters of the casing chambers in which they operate.

With the construction shown and described, and assuming oil or other lubricant tending to flow from the left toward the right, as viewed in Figure 1, all such lubricant will first encounter the impeller B adjacent the shaft with which it has a fluid-tight engagement and will then gradually flow outwardly along the corresponding adjacent face of the impeller and be thrown out under centrifugal action. The lubricant will then collect more or less in the notches 22 and in the outer zone of the chamber and will be pumped or forced backwardly to the interior of the housing chamber through the discharge opening 20, as will be understood. Similarly, any moisture, dust or other foreign matter tending to enter the shaft bearing from the right, as viewed in Figure 1, will be caught by the impeller C and gradually thrown outwardly thereby and ultimately discharged back to atmosphere through the discharge opening 21.

Referring next to the construction illustrated in Figures 3 and 4, the same is similar to that shown in Figures 1 and 2, with the exception that an additional central chamber is provided within the casing A', such central chamber being obtained by introducing a second partition member D', the parts being assembled and held in assembled relation in the same manner as previously described for the Figure 1 construction. In the two end chambers are provided impellers B' and C' constructed and operating in exactly the same manner as the corresponding parts B and C of Figure 1. Within the centrally disposed chamber is disposed a third similar impeller or slinger $D^2$, there being, however, no communicating or discharge ports between the two partition members and the respective end chambers, that is, the central chamber is a sealed or closed chamber. In this construction, any lubricant passing the impeller B' or any moisture passing the impeller C' and seeping into the central chamber of the seal, will be caught by the central impeller $D^2$ and gradually collected in the outer zone of the latter, forming a liquid seal around the periphery of the impeller $D^2$ and preventing passage in either direction from the central chamber to either of the end chambers, that is, the central impeller $D^2$ will work in a closed liquid circuit in the event lubricant and/or moisture collects therein and will thereby maintain sufficient back pressure to prevent admission of any additional liquid thereinto or the passage completely therethrough from either direction.

From the preceding description, it will be seen that the improved seal can be manufactured at relatively small expense; all of the parts readily adapt themselves to mass production; the parts can be easily assembled into a unitary structure, shipped and applied as such and, when in place, a rotative but fluid-tight joint is formed between the seal and the shaft and a non-rotative fluid-tight joint between the casing and the shaft housing, it being understood that the casing will be made of such outside diameter as to provide a closed fluid-tight friction fit with the housing 11.

While the preferred manner of carrying out the invention has been illustrated and described, it will be understood that various changes and modifications may be made without departing from the spirit of the invention and all such changes and modifications are contemplated that come within the scope of the claims appended hereto.

What is claimed is:

1. As an article of manufacture, a seal for insertion as an assembled unit within a housing having a centrally located shaft therein, said seal including: a casing having axially spaced side walls and a peripheral wall, the side walls being apertured to accommodate a shaft and one of said side walls having also a discharge opening therein; an impeller confined and rotatable within the casing, said impeller being adapted to have a snug driving fit with the shaft when slipped thereover and provided in the surface thereof facing the discharge opening with means for centrifugally discharging any matter collecting thereon to and through said discharge opening.

2. As an article of manufacture, a seal for insertion as an assembled unit within a housing having a centrally located shaft therein, said seal including: a casing having a central partition dividing the casing into two chambers, each of the side walls of the casing having a discharge opening; and two impellers, one in each chamber, each of said impellers comprising a disc adapted for fluid-tight frictional driving fit with the shaft for returning air in one direction through one side wall and returning oil in the opposite direction through the other side wall.

3. As an article of manufacture, a seal for insertion as an assembled unit within a housing having a centrally located shaft therein, said seal including: an annular casing having two end chambers and an intermediate chamber, said end chambers having discharge openings therefrom; and impellers located one in each chamber and each adapted to have fluid-tight frictional driving fit with a shaft extended therethrough, said disks having radial grooves therein which register with said discharge openings upon each revolution of the disks.

4. A seal of the character described comprising: an outer cup shaped member; three shallower cup shaped members telescoped within the outer member and oppositely disposed to thereby provide three chambers, the end walls of the assembly being provided with discharge openings; and centrifugally acting means disposed in each of said chambers.

5. A seal of the character described comprising: an outer cup shaped member; a plurality of shallower cup shaped members all telescoped within the outer member and oppositely disposed to thereby provide a corresponding plurality of chambers, the end walls of the assembly being provided with discharge openings; and centrifugally acting means disposed in each of said chambers.

6. In an oil sealing device, a self-contained unit comprising an annular sheet metal casing which is adapted to be forced into a housing about a centrally located shaft and is provided with an inwardly opening channel of U-shaped radial section, and a centrally apertured disk which is rotatably positioned within the channel and is adapted to be forced over the shaft into non-rotatable pressed fit association with the latter while supported throughout practically its entire area by one of the sides of the channel.

7. In an oil sealing device, a self-contained unit comprising an annular sheet metal casing which is adapted to be forced into a housing about a centrally located shaft and is provided with an inwardly opening channel of U-shaped radial section, and a centrally apertured disk which is rotatably positioned within the channel and is adapted to be forced over the shaft into non-rotatable pressed fit association with the latter while supported throughout practically its entire area by one of the sides of the channel, said disk being provided adjacent its outer periphery with one or more recesses, and said casing being provided in the side wall which faces the recesses with one or more openings through which any oil accumulating in the recesses is adapted to be discharged.

3. A seal of the character described comprising a casing centrally apertured to accommodate a shaft and formed with two separated chambers with oppositely directed discharge openings, and centrifugally acting means in said chambers cooperable with the casing for collecting matter accumulating from both directions along the shaft and discharging the same from the casing through said openings in the opposite directions from which accumulated.

CLARENCE T. OLSON.